United States Patent [19]

Pirooz

[11] 4,444,813

[45] Apr. 24, 1984

[54] METHOD OF MAKING A SEALING GLASS SUSPENSION

[75] Inventor: Perry P. Pirooz, Toledo, Ohio

[73] Assignee: Owens-Illinois, Inc., Toledo, Ohio

[21] Appl. No.: 404,204

[22] Filed: Aug. 2, 1982

[51] Int. Cl.³ .......................... B32B 3/02; C08L 1/18
[52] U.S. Cl. ............................. 427/284; 106/193 R; 106/195; 106/198
[58] Field of Search ............... 106/198, 193; 524/903, 524/906; 427/284

[56] References Cited

U.S. PATENT DOCUMENTS

| | | | |
|---|---|---|---|
| 3,383,344 | 5/1968 | Gill | 524/903 |
| 3,967,973 | 7/1976 | Francel | 106/193 |
| 4,137,341 | 1/1979 | Adachi | 427/284 |

FOREIGN PATENT DOCUMENTS 339567  6/1972  U.S.S.R. ............................. 524/903

*Primary Examiner*—Theodore Morris
*Attorney, Agent, or Firm*—David R. Birchall; Myron E. Click

[57] ABSTRACT

Particulate sealing glass material is metered into a mixing container to occupy a portion of the volume of the mixing container. A selected amount of a gel producing vehicle is then introduced to the interior of said mixing container. The mixing container is then agitated for a predetermined length of time to thoroughly interdisperse the vehicle throughout the particulate sealing glass material.

4 Claims, No Drawings

METHOD OF MAKING A SEALING GLASS SUSPENSION

BACKGROUND OF THE INVENTION

In the manufacture of cathode ray tubes, and in particular, color or polychromatic reception, it is necessary to utilize a sealing glass to adhere the frontal viewing portion of the CRT, known as the faceplate, to the rear portion of the CRT, known as the funnel assembly. The faceplate flange edge mates with a similar edge of the funnel and the two parts are sealed together by means of a sealing glass that has a melting point less than the melting point of the glass used in the fabrication of the faceplate and the funnel.

The sealing glass may be either vitreous or of a type that devitrifies after it has been thermally treated. The actual seal is effected by placing a prescribed layer or bead of sealing glass paste on the funnel edge adjacent the large end of the funnel. The sealing glass paste contains a predominate amount of finely ground particulate glass mixed with a vehicle to provide certain fluid characteristics to the mixture. The sealing glass paste, as it is known in the trade, must possess characteristics that permit its deposit on the glass edges that are to be sealed together to be quite even in overall cross-section and to remain in situ without undue distortion or flow until actual firing takes place. To create the most desirable sealing glass paste, not only must the glass particle size be carefully regulated, but also, the vehicle must be blended with thixotropic and gelling agents.

The actual mixing of the sealing glass is important and contributes greatly to a successful high speed assembly of CRT's utilized in the television industry. In the past, sealing glass in the powdered form was supplied to the CRT manufacturer. The powder was then combined with the proper amount of vehicle and the ingredients were then mixed in a standard industrial mixer of one type or another. The mixed sealing glass paste was then removed from the mixer after thorough agitation and then placed in a paste dispensing machine for direct application to the seal edge or edges of the glass parts to be joined together.

The actual preparation of the sealing glass paste by the CRT manufacturer as described above is an unwanted task, however, such in situ mixing of the sealing glass paste in the past was dictated because the paste had to be used shortly after mixing because of the inherent nature of the paste to increase in viscosity in an unpredictable manner, thus resulting in an unacceptable paste mixture. Then too, the CRT manufacturer was confronted with dust problems associated with the loading of the particulate sealing glass into the mixer.

During the formulation of a typical sealing glass suspension suitable for joining together glass components of a CRT, a pyrolyzable organic binder coupled with an organic solvent is utilized. A typical binder is nitrocellulose and a suitable solvent is amyl acetate. The range of the binder plus solvent is generally in the range of 6-10 percent by weight as it is combined with the heavier fritted glass powder.

Another problem encountered with paste suspensions was that they were susceptible to changes over a relatively short period of time. This change in paste characteristics directly affected the paste dispensing apparatus so that frequent adjustment of the dispensing apparatus was required in order to achieve a uniform bead or extrusion of the paste onto the edge or edges of the glass parts being readied for subsequent sealing together.

The undesirable characteristics of the prior in situ mixed sealing glass suspensions severely limited the useful life of the sealing glass paste plus caused an unwanted lead dust contamination in the workplace where the paste was mixed.

It is one of the main objects of the present invention to provide an improved sealing glass mixture with a consistant and predictable shelf life subsequent to the mixing thereof.

It is another object of the present invention to provide a technique for the confinement of all particulate contaminants during the mixing of the fritted glass and its binder solvent additive.

It is a further object of the instant invention to provide a sealing glass compatable with existing dispensing apparatus.

SUMMARY OF THE INVENTION

In accordance with the present invention and particularly the method associated with providing a sealing glass mixture with predictable shelf life, the following text will describe the present invention.

The present invention presents a sealing glass plate system that eliminates a toxic material dust problem and provides for adjustments of the sealing glass paste properties at the point of use. The present invention circumvents the shelf life problem associated with the conventional procedure of large scale mixing of the sealing glass paste by the manufacturer and the subsequent shipping to the television tube assembler. The handling and shipment of a dry powder is simpler than the shipment of a solvent containing material. The overall cost associated with the powder concept reduces the overall costs of the tube maker. Then too, the tube maker has the flexibility of using the sealing glass powder for either low viscosity or high viscosity thixotropic sealing glass paste mixtures.

It has been pointed out supra that sealing glass mixtures have a certain finite useful shelf life and once that shelf life is exceeded, unacceptable dispensing or bad glass to glass seals will occur. To provide an improved sealing glass paste mixture, a gelling agent is added in a proportion at least sufficient to render the paste essentially nonsettling and nonsagging under the influence of gravity. Settling generally occurs when there is a separation of the organic vehicle from the powdered glass. The mere standing for a relatively short period of time can cause settling. Sagging occurs when the paste has been extruded onto a glass part. The change in cross-section of the extruded paste mixture because of sagging is undesirable.

Through the addition of a suitable gelling agent to a sealing glass suspension, a sealing glass mixture having the characteristics of a reversible gel may be provided.

One of the essential constituents of a gelable agent which renders the mixture thixotropic. Such gelling agents may be Cab-O-Sil, a trademarked brand of silicate manufactured by the Cabot Corporation. Also, the preferred gelling agent of the present invention is a titanium coupling agent designated as KR-38-S manufactured by Kendrich Petrochemicals, Inc.

In addition to the powdered glass frit and the nitrocellulose plus amyl acetate vehicle components, the gelling agent imparts a gelled structure to the glass-organic vehicle suspension. The quantity of the gelling agent may be adjusted for any particular application, however, the gelling agent should be present in an amount at least sufficient to render the suspension essentially nonsettling and nonsagging under the influence of gravity.

The desirable gelling agents are those which do not adversely effect the sealing process or the mechanical post-sealing integrity of the final seal. The gelling agent may be one that is evaporable, or upon the application of heat, pyrolyzable, or else it may remain within the seal structure without deleterious effects to the overall seal, or the operation of the tube itself.

The best gelling agents are those having a strong relatively permanent gelling effect when present in the overall paste mixture in a minor proportion to the ground glass-vehicle mixture. As previously pointed out, both inorganic and organic gelling agents have been found useful in producing gelling in sealing glass paste compositions. Among the inorganic agents producing desirable gelling in sealing glass systems are water, colloidal silica, and various aluminosilicate clays such as bentonite, kaolinite and attapulgus clays. The silica and the clays enhance gelling by thickening while water can enhance gelling by flocculation. The organic agents which produce desirable results in sealing glass systems are exemplified by flocculants such as methanol, acetic acid, lecithin and other flocculating surfactants. The preferred flocculating agent of the present invention is one of the organic titanates.

In the practice of the present invention, it is highly desirable to utilize a gelling agent with reversible gelling behavior. The basic sealing glass paste can be mixed and stored without undue settling occurring. The gel structure can be reversed temporarily while the paste is being dispensed from a dispensing apparatus and deposited on the sealing edge of a glass part. After the desired bead configuration has been deposited on the glass part, the mixture once again assumes a gel structure and does not deviate appreciably from the originally laid down bead cross-section configuration.

One gelling agent that is particularly suitable as a gelling agent for the present invention has been found to be one of the family of organic titanates which are commonly known in the chemical art as titanate coupling agents. A coupling agent of titanium has the following general formula:

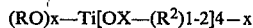

where RO is a coupling group consisting of an oxyacetate group or an alkoxy or aryloxy group of from 2-10 carbon atoms, Ti is tetravalent titanium, x is 1 or 2, corresponding to the number of titanium bonding sites occupied by the RO coupling groups, OX is a carboxy, phosphato or pryophosphato bind group member, and $R^2$ is an aliphatic or aromatic hydrocarbon group of from 6-20 carbon atoms.

The specific titanate coupling agent that has been found particularly useful is an agent identified as isopropyl tri(dioctylpyrophosphato) titanate which has a formula believe to be the following:

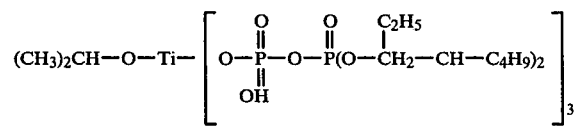

DETAILED DESCRIPTION

Sealing glass powder is manufactured under special conditions dictated by the nature of the oxides used to effect a low melting sealing glass. Since lead is one of the more toxic materials associated with low temperature sealing glasses, it is quite important to reduce as much as possible all airborne transportation of such powders. To achieve a minimum amount of airborne particle disbursement during the mixing of a sealing glass paste, a metered quantity of fritted or powdered sealing glass is placed into a cylindrically shaped metal can, the interior surface of which is specially treated so as to be compatible with the organic vehicle blend of amyl acetate, nitrocellulose and gelling agents. The accurately weighed and packed sealing glass is then shipped from the sealing glass manufacturer to the point of use, that is, the television tube maker. The tube maker then injects the proper quantity of amyl acetate-nitrocellulose-gelling agent vehicle into the metal can. The injection of the vehicle into the can is facilitated by the placement of an ingress aperture in the form of a hole in the lid of the metal can. The aperture is just large enough to permit the vehicle injection nozzle to pass therethrough. In this manner, the vehicle can be introduced to the can interior without releasing any of the sealing glass powder to the atmosphere. Subsequent to the placement of the vehicle into the can interior, the ingress aperture is sealed over by means of adhesive tape or other plug means. The can, which now contains the sealing glass powder plus the vehicle and gelling agent, is agitated for a prescribed length of time. The most convenient and preferred form of agitation can be achieved by placing the can on a set of rolls set at, for example, greater than 5 but less than 80 revolutions per minute (RPM) for a time period greater than 15 minutes but less than 6 hours. It is important that the rolls not move at too low RPM because the contents thereof will simply slide around the arcuate interior surface of the can and insufficient mixing will occur. If the can is rotated at too high RPM, then the centrifugal force will simply hold the contents of the can against the can interior surface, consequently, there will be little mixing of the sealing glass powder with the vehicle.

After the can and its contents have been subjected to the optimum agitation, the can and its mixed contents are stored preferrably at ambient temperature 60°–80° F. for a time interval of 20–40 hours so that the proper gel structure will form in the mixture.

When it is desired to use the contents of the can, the can and its contents is then placed on a paint shaker for a period of 3–5 minutes. The can and contents is then held in an undisturbed condition for approximately 30 minutes. The sealing glass paste is then transferred to a dispensing apparatus. The dispensing apparatus then dispenses the sealing glass mixture in a uniform bead which is laid down on the edge of a glass television part.

Returning once more to the actual composition of the sealing glass mixture, the preferred quantity of the vehicle to be added to the sealing glass powder is in the range of 7.0–8.0 percent by weight. The preferred range of the gelling agent is in the range of 0.05–0.15 percent by weight.

What is claimed is:

1. A method of mixing a sealing glass paste, including the steps of:
    (a) introducing a weighed amount of a particulate sealing glass material into an apertured container, (b) closing the container so as to prevent the contents of said container from exiting therefrom, (c) permitting the container and its contents to remain in the dry state for a given period of time, (d) aligning a dispensing means with an aperture in the wall of said container, (e) injecting a metered amount of an organic binder that contains a titanium coupling agent into said container through said dispensing means, (f) withdrawing said dispensing means from the interior of said container, (g) subjecting said container and the contents thereof to agitation so as to thoroughly mix the organic binder with the sealing glass.

2. A method of mixing a sealing glass paste including the steps of:

(a) introducing a weighed amount of a particulate sealing glass composition into a cylindrical container, said glass composition occupying less volume than that of said container, (b) closing the container so as to prevent the particulate sealing glass from escaping into the surrounding atmosphere from the confinement of said container, (c) permitting the container and its contents to remain in the dry state during transportation, (d) aligning a dispensing means with an aperture in said container, (e) injecting a metered amount of an organic vehicle that contains a titanium coupling agent into said container through said dispensing means, (f) withdrawing said dispensing means from the interior of said container, (g) subjecting said container and the contents thereof to agitation so as to thoroughly mix the organic binder with the sealing glass, (h) storing the sealing glass paste for a time period sufficient to permit a gel condition to form, (i) transferring the mixed contents of said container to a sealing glass dispenser, (j) depositing a bead of sealing glass paste on the edge of a glass substrate so that said substrate can be sealed to another glass part by the firing thereof.

3. A method of mixing a sealing glass paste including the steps of:

(a) introducing a weighed amount of a powdered particulate sealing glass composition into a cylindrical metallic container through a first opening in said container, said glass composition occupying less volume than that of said container, (b) exposing the open container with the contents therein to ambient atmospheric conditions until the sealing glass composition has reached the desired moisture content, (c) closing said first opening in said container so as to prevent the particulate sealing glass from escaping into the surrounding atmosphere from the confinement of said container, (d) permitting the container and its contents to remain at constant moisture content during transportation, (e) aligning a dispensing means with a second opening in said container, (f) injecting a metered amount of an organic vehicle in the form of a blend of amyl-acetate and nitrocellulose into said container through said dispensing means, (g) withdrawing said dispensing means from the vicinity of said container and closing said second opening, (h) subjecting said container and the contents thereof to agitation so as to thoroughly mix the organic vehicle with the sealing glass, (i) storing the sealing glass paste for a time period sufficient to permit a gel condition to form, (j) transferring the mixed contents of said container to a sealing glass dispenser, (k) depositing a bead of sealing glass paste on the edge of a glass substrate so that said substrate can be sealed to another glass part by the firing thereof.

4. A method of mixing a sealing glass paste including the steps of:

(a) introducing a weighed amount of a powdered particulate sealing glass composition into a cylindrical metallic container through a first opening in said container, said glass composition occupying less volume than that of said container, (b) exposing the open container with the contents therein to ambient atmospheric conditions until the sealing glass composition has reached the desired moisture content, (c) closing said first opening in said container so as to prevent the particulate sealing glass from escaping into the surrounding atmosphere from the confinement of said container, (d) permitting the container and its contents to remain at constant moisture content during transportation, (e) aligning a dispensing means with a second opening in said container, (f) injecting a metered amount of an organic vehicle, in the form of a blend of amyl-acetate and nitrocellulose which contains a titanium coupling agent in the amount ranging from 0.05 weight percent to 0.15 weight percent, into said container through said dispensing means, (g) withdrawing said dispensing means from the vicinity of said container and closing said second opening, (h) subjecting said container and the contents thereof to agitation so as to thoroughly mix the organic vehicle with the sealing glass, (i) storing the sealing glass paste for a time period sufficient to permit a gel condition to form, (j) transferring the mixed contents of said container to a sealing glass dispenser, (k) depositing a bead of sealing glass paste on the edge of a glass substrate so that said substrate can be sealed to another glass part by the firing thereof.

* * * * *